US011113480B2

(12) United States Patent
Norouzi et al.

(10) Patent No.: US 11,113,480 B2
(45) Date of Patent: Sep. 7, 2021

(54) NEURAL MACHINE TRANSLATION SYSTEMS

(71) Applicant: GOOGLE LLC, Mountain View, CA (US)

(72) Inventors: Mohammad Norouzi, Sunnyvale, CA (US); Zhifeng Chen, Sunnyvale, CA (US); Yonghui Wu, Fremont, CA (US); Michael Schuster, Saratoga, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 85 days.

(21) Appl. No.: 16/336,870

(22) PCT Filed: Sep. 25, 2017

(86) PCT No.: PCT/US2017/053267
§ 371 (c)(1),
(2) Date: Mar. 26, 2019

(87) PCT Pub. No.: WO2018/058046
PCT Pub. Date: Mar. 29, 2018

(65) Prior Publication Data
US 2020/0034435 A1 Jan. 30, 2020

Related U.S. Application Data

(60) Provisional application No. 62/399,990, filed on Sep. 26, 2016.

(51) Int. Cl.
*G06F 40/58* (2020.01)
*G06F 40/44* (2020.01)
*G06N 3/04* (2006.01)

(52) U.S. Cl.
CPC .............. *G06F 40/58* (2020.01); *G06F 40/44* (2020.01); *G06N 3/0445* (2013.01); *G06N 3/0454* (2013.01)

(58) Field of Classification Search
CPC .......... G06F 40/58; G06F 40/44; G06F 40/56; G06F 40/40; G06N 3/0445; G06N 3/0454; G06N 3/084
(Continued)

(56) References Cited

U.S. PATENT DOCUMENTS 10,733,380 B2 * 8/2020 Leidner .................. G06F 17/18
2016/0299938 A1 * 10/2016 Malhotra ............. G06K 9/6284
(Continued)

FOREIGN PATENT DOCUMENTS

CN 105159890 12/2020
EP 3046053 7/2016

OTHER PUBLICATIONS

SG Examination Report in Singapore Application No. 10201707936T, dated Sep. 30, 2019, 5 pages.
(Continued)

*Primary Examiner* — Edwin S Leland, III
(74) *Attorney, Agent, or Firm* — Fish & Richardson P.C.

(57) ABSTRACT

Methods, systems, and apparatus, including computer programs encoded on computer storage media, for neural machine translation. One of the systems includes an encoder neural network comprising: an input forward long short-term memory (LSTM) layer configured to process each input token in the input sequence in a forward order to generate a respective forward representation of each input token, an input backward LSTM layer configured to process each input token in a backward order to generate a respective backward representation of each input token and a plurality of hidden LSTM layers configured to process a respective combined representation of each of the input tokens in the forward order to generate a respective encoded representation of each of the input tokens; and a decoder subsystem configured to receive the respective encoded representations
(Continued)

and to process the encoded representations to generate an output sequence.

19 Claims, 6 Drawing Sheets

(58) Field of Classification Search
USPC .......................................................... 704/2
See application file for complete search history.

(56) References Cited

U.S. PATENT DOCUMENTS

| | | | | |
|---|---|---|---|---|
| 2017/0109355 | A1* | 4/2017 | Li | G06N 3/0445 |
| 2018/0329883 | A1* | 11/2018 | Leidner | G06F 16/2237 |
| 2019/0034416 | A1* | 1/2019 | Al Hasan | G06N 3/0454 |
| 2019/0377792 | A1* | 12/2019 | Zhang | G06N 5/022 |
| 2020/0034435 | A1* | 1/2020 | Norouzi | G06N 3/0445 |
| 2020/0104746 | A1* | 4/2020 | Strops | G06N 20/00 |
| 2020/0272695 | A1* | 8/2020 | Dogan | G06N 3/08 |

OTHER PUBLICATIONS

Tang et al., "A pruning based method to learn both weights and connections for LSTM," NIPS, Dec. 2015, 7 pages.
Abadi et al, "Tensorflow: A system for large-scale marchine learning," arXiv, May 31, 2016, 18 pages.
Bandanau et al, "Neural machine translation by jointly learning to align an dtranslate," arXiv, May 19, 2016, 15 pages.
Brown et al, "A statistical approach to language translation," ACM Digital Library, Aug. 1988, 6 pages.
Brown et al, "A statistical approach to machine translation," ACM Digital Library, Jun. 1990, 7 pages.
Buck et al, "N-gram counts and languge models from the common crawl," In LREC, May 2014, 6 pages.
Cho et al, "Learning phrase representations using RNN encoder-decoder for statistical machine translation," arXiv, Sep. 2014, 15 pages.
Chrisman et al, "Learning recursive distributed representations for holistic computations," Citeseerx, 1991, 33 pages.
Chung et al, "A character-level decoder without explicit segmentation for neural machine translation," arXiv, Jun. 21, 2016, 11 pages.
Costa-Jussa et al, "Character-based neural machine translation," arXiv, Jun. 30, 2016, 5 pages.
Devlin et at, "Fast and robust neural network joint models for statistical machine translation," Jun. 2014, 11 pages.
Dong et al, "Multi-task learning for multiple language translation," ACL Web, Jul. 2015, 10 pages.
Durrani et al, "Edinburgh's phrase-based machine translation systems for WMT-14," ACL Web, Jun. 2014, 8 pages.
Fahlman et al, "The cascade-correlation learning architecture," Citeseerx, 1990, 9 pages.
Gers et al, "Learning to Forget: Continual prediction with LSTM," Semantic Scholar, 7 pages.
Gulcehre et al, "Pointing the unknown words," arXiv, Aug. 21, 2016, 10 pages.
Gupta et al, "Deep learning with limited numerical precision," Feb. 9, 2015, 10 pages.
Han et al, Deep compression: Compressing deep neural network with pruning, trained quantization and huffman coding, arXiv, Feb. 26, 2016, 14 pages.
He et al, "Deep residual learning for image recognition," arXiv, Dec. 10, 2015, 12 pages.
Hochreiter et al, "Gradient flow in recurrent nets: the difficulty of learning long-term dependencies," IEEE Xplore, 2001, 15 pages.
Hochreiter et al, "Long short-term memory," Neural Computation, 1997, 32 pages.
Jean et al, "On Using Very Large Target Vocabulary for Neural Machine Translation", arXiv, Mar. 2015, 10 pages.
Kalchbrenner et al, "Recurrent continuous translation models," ALC Web, Oct. 2013, 10 pages.
Kingma et al, "A method for stochastic optimization," arXiv, Jan. 30, 2017, 15 pages.
Koehn et al, "Stastistical phrase-based translation," ALC Web, Jun. 2003, 7 pages.
Li et al, "Ternary weight networks," arXiv, Nov. 19, 2016, 5 pages.
Luong et al, "Achieving open vocabulary neural machine translation with hybrid word-character models," arXiv, Jun. 23, 2016, 11 pages.
Luong et al, "Addressing to rare word problem in neural machine translation," arXiv, May 30, 2015, 9 pages.
Luong et al, "Effective Approaches to Attention-based Neural Machine Translation," arXiv, Sep. 20, 2015, 11 pages.
Luong et al, "Multi-task sequence to sequence learning," arXiv, Mar. 1, 2016, 10 pages.
Norouzi et al, "Reward Augmented Maximum Likelihood for Neural Structured Prediction," arXiv, Jan. 4, 2017, 11 pages.
Pascanu et al, "Understanding the exploding gradient problem," arXiv, Nov. 21, 2012, 11 pages.
PCT International Preliminary Report on Patentability in International Appln. No. PCT/US2017/503267, dated Apr. 4, 2019, 16 pages.
PCT International Search Report and Written Opinion in International Appln. No. PCT/US2017/503267, dated Jan. 11, 2018, 23 pages.
Ranzato et al, "Sequence level training with recurrent neural networks," arXiv, May 6, 2016, 16 pages.
Zens et al: "A Systematic Comparison of Phrase Table Pruning Techniques", Google Inc, 2012, 12 pages.
Schuster et al, "Bidirectional recurrent neural networks," Semantic Scholar, Nov. 1997, 9 pages.
Schuster et al, "Japanese and Korean voice search," IEEE Xplore, 2012, 4 pages.
Sebastien et al, "On using very large target vocabulary for neural machine translation," arXiv, Mar. 18, 2015, 10 pages.
Sennrich et al, "Neural Machine Translation of Rare Words with Subword Units", arXiv, Jun. 2016, 11 pages.
Shen et al, "Minimum risk training for neural machine translation," arXiv, Jun. 15, 2016, 10 pages.
Srivastava et al, "Highway Networks," arXiv, Nov. 3, 2015, 6 pages.
Sutskever et al, "Sequence to sequence learning with neural networks," arXiv, Dec. 14, 2014, 9 pages.
Tu et al, "Modeling Coverage for Neural Machine Translation", arXiv, Aug. 6, 2016, 11 pages.
Wu et al, "Quantized Convolutional Neural Networks for Mobile Devices", IEEE Xplore, 2016, 9 pages.
Wu, "Google's Neural Machine Translation System: Bridging the Gap between Human and Machines Translations," arXiv, Oct. 2016.
Zaremba et al, "Recurrent neural network regularization," arXiv, Feb. 19, 2015, 8 pages.
Zhou et al, "Deep Recurrent Models with Fast-Forward Connections for Neural Machine Translation", arXiv, Jul. 2016.
CN Office Action in Chinese Application No. 201710882491.0 dated Jul. 16, 2020, 33 pages (with English translation).
JP Office Action in Japanese Application No. 2019-516134, dated Aug. 11, 2020, 8 pages (with English translation).
KR Office Action in Korean Application No. 10-2019-7008608, dated Aug. 18, 2020, 12 pages (with English translation).
IN Office Action in Indian Application No. 201927007973, dated Feb. 1, 2021, 5 pages (with English translation).

\* cited by examiner

NEURAL MACHINE TRANSLATION SYSTEMS

BACKGROUND

This specification relates to translating text using neural networks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

Some neural networks are recurrent neural networks. A recurrent neural network is a neural network that receives an input sequence and generates an output sequence from the input sequence. In particular, a recurrent neural network uses some or all of the internal state of the network after processing a previous input in the input sequence in generating an output from the current input in the input sequence.

SUMMARY

This specification describes a system implemented as computer programs on one or more computers in one or more locations that translates text from a source language to a target language using neural networks.

In some aspects of the described subject matter, a neural machine translation system implemented by one or more computers is configured to receive an input sequence of input tokens representing a first sequence of words in a first natural language and to generate an output sequence of output tokens representing a second sequence of words that is a translation of the first sequence into a second natural language and comprises: an encoder neural network and a decoder subsystem. The encoder neural network, in turn, comprises: an input forward long short-term memory (LSTM) layer configured to process each input token in the input sequence in a forward order to generate a respective forward representation of each input token, an input backward LSTM layer configured to process each input token in the input sequence in a backward order to generate a respective backward representation of each input token, a combining layer configured to, for each input token in the input sequence, combine the forward representation of the input token and the backward representation of the input token to generate a combined representation of the input token, and a plurality of hidden LSTM layers configured to process each combined representation in the forward order to generate a respective encoded representation of each of the input tokens in the input sequence. The decoder subsystem is configured to receive the respective encoded representation of each of the input tokens in the input sequence and to process the encoded representations to generate the output sequence.

In some of these aspects, the hidden LSTM layers are arranged in a stack one after the other, and wherein the plurality of hidden LSTM layers comprises at least seven LSTM layers. In some of these aspects, at least two of the plurality of hidden LSTM layers are connected with a residual connection.

In some of these aspects, the decoder subsystem comprises: a decoder neural network, the decoder neural network comprising: a plurality of LSTM layers arranged in a stack one on top of the other and configured to, for each of a plurality of positions in the output sequence: receive an attention context vector and the output token at a preceding position in the output sequence, and process the attention context vector and the token at the preceding position in the output sequence to generate an LSTM output for the position, and a softmax output layer, the softmax output layer configured to, for each of the plurality of positions, receive the LSTM output for the position and to generate a respective score for each output token in a vocabulary of output tokens.

In some of these aspects, the plurality of LSTM layers in the decoder comprises at least eight LSTM layers. In some of these aspects, the plurality of LSTM layers in the decoder comprises at least eight LSTM layers. In some of these aspects, least two of the plurality of LSTM layers in the decoder are connected with a residual connection. In some of these aspects, a first LSTM layer in the stack is configured to, for each of the plurality of positions: receive a first layer input comprising the attention context vector, a layer output generated by a LSTM layer directly below the first LSTM layer in the stack, and a layer input to the LSTM layer directly below the first LSTM layer in the stack; and process the first layer input in accordance with a current hidden state of the first LSTM layer to generate a first layer output and to update the current hidden state.

In some of these aspects, the decoder system further comprises: an attention subsystem, wherein the attention subsystem is configured to, for each of the plurality of positions: receive an attention input comprising a bottom layer output generated by a bottom LSTM layer in the stack of LSTM layers in the decoder neural network for the preceding position; and process the attention input to generate the attention context vector for the time step.

In some of these aspects, processing the bottom layer output and the respective encoded representation of each of the input tokens in the input sequence to generate the attention context vector for the time step comprises, for each of the plurality of time steps: processing the bottom layer output and the encoded representations through one or more neural network layers to generate a respective score for each of the input tokens; generating a respective weight for each of the input tokens from the respective scores; and determining a weighted sum of the encoded representations in accordance with the weights.

In some of these aspects, the input and output tokens are wordpieces.

In some of these aspects, the encoder neural network and the decoder subsystem are configured to perform quantized computations during generation of the output sequence.

Other aspects include one or more computer storage media encoded with instructions that, when executed by one or more computers, cause the one or more computers to implement the neural machine translation system of any of the above aspects.

Some other aspects include methods of generating an output sequence of output tokens that represents a second sequence of words that is a translation of a first sequence of words into a second natural language that include the actions of: obtaining a plurality of candidate output sequences from a neural machine translation system; maintaining at most a predetermined number of the candidate output sequences in a beam for further consideration by the neural machine translation system, comprising: assigning a respective score to each candidate output sequence; ranking the candidate output sequences based on the respective scores; removing from the beam all candidate output sequences other than the predetermined number of highest-ranked candidate output sequences according to the ranking; determining whether any of the candidate output sequences in the beam have been identified as a finalized candidate output sequence by the neural machine translation system; and when at least one of the candidate output sequences has been identified as a finalized candidate output sequence: removing from the beam all candidate output sequences that have a score that is more than a threshold value lower than the score for a highest-ranked finalized candidate output sequence.

In some of these aspects, determining whether any of the candidate output sequences have been identified as a finalized candidate output sequence by the neural machine translation system comprises: determining whether any of the candidate output sequence ends with a predetermined end-of-sentence output token.

In some of these aspects, assigning a respective score to each candidate output sequence comprises: determining a log likelihood of the candidate output sequence according to output scores generated by the neural machine translation system; and normalizing the log likelihood based on a number of output tokens in the candidate output sequence to generate a length normalized log likelihood.

In some of these aspects, assigning a respective score to each candidate output sequence further comprises: modifying the length normalized log likelihood using a coverage penalty to favor candidate output sequences that fully cover the words in the first sequence.

In some of the aspects, when all of the candidate output sequences in the beam have been identified as a finalized candidate output sequence by the neural machine translation system, the actions further include selecting a highest-scoring candidate output sequence as the output sequence.

Other aspects include one or more computer storage media encoded with instructions that, when executed by one or more computers, cause the one or more computers to perform the operations of any of the above methods.

Other aspects include a system comprising one or more computers and one or more storage devices storing instructions that, when executed by the one or more computers, cause the one or more computers to perform the operations of any of the above methods.

Particular embodiments of the subject matter described in this specification can be implemented so as to realize one or more of the following advantages.

By using a bi-directional LSTM layer as the bottom layer of the encoder, the context for the words in the input sequence can effectively be captured, improving translation quality. Because the other encoder layers are unidirectional, parallelization during computations can still be achieved, reducing training and, in some cases, inference times.

By using deep stacks of LSTM layers in both the encoder and the decoder, e.g., 8 or more total LSTM layers in each of the decoder and encoder, both the encoder and decoder are deep enough to capture subtle irregularities in the source and target languages, improving the accuracy of translations generated by the system.

By connecting the bottom layer of the decoder to the top layer of the encoder through the attention subsystem, parallelism can be increased and training time can thereby be decreased while still employing an effective attention scheme that allows the decoder neural network to accurately translate the source sequence. That is, because the attention subsystem receives input from the bottom LSTM layer in the decoder and not from any of the other LSTM layers in the decoder and unlike conventional attention schemes, the computation performed by the attention subsystem can effectively be performed in parallel with computations performed by the other LSTM layers without adversely impacting the quality of the translation.

By employing low-precision arithmetic, i.e., quantized computation, during inference computations, as described in this specification, the final translation time can be accelerated while maintaining high translation quality.

By decoding using the described beam search techniques, translation time at inference can be decreased while maintaining a high translation quality relative to conventional beam search techniques.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
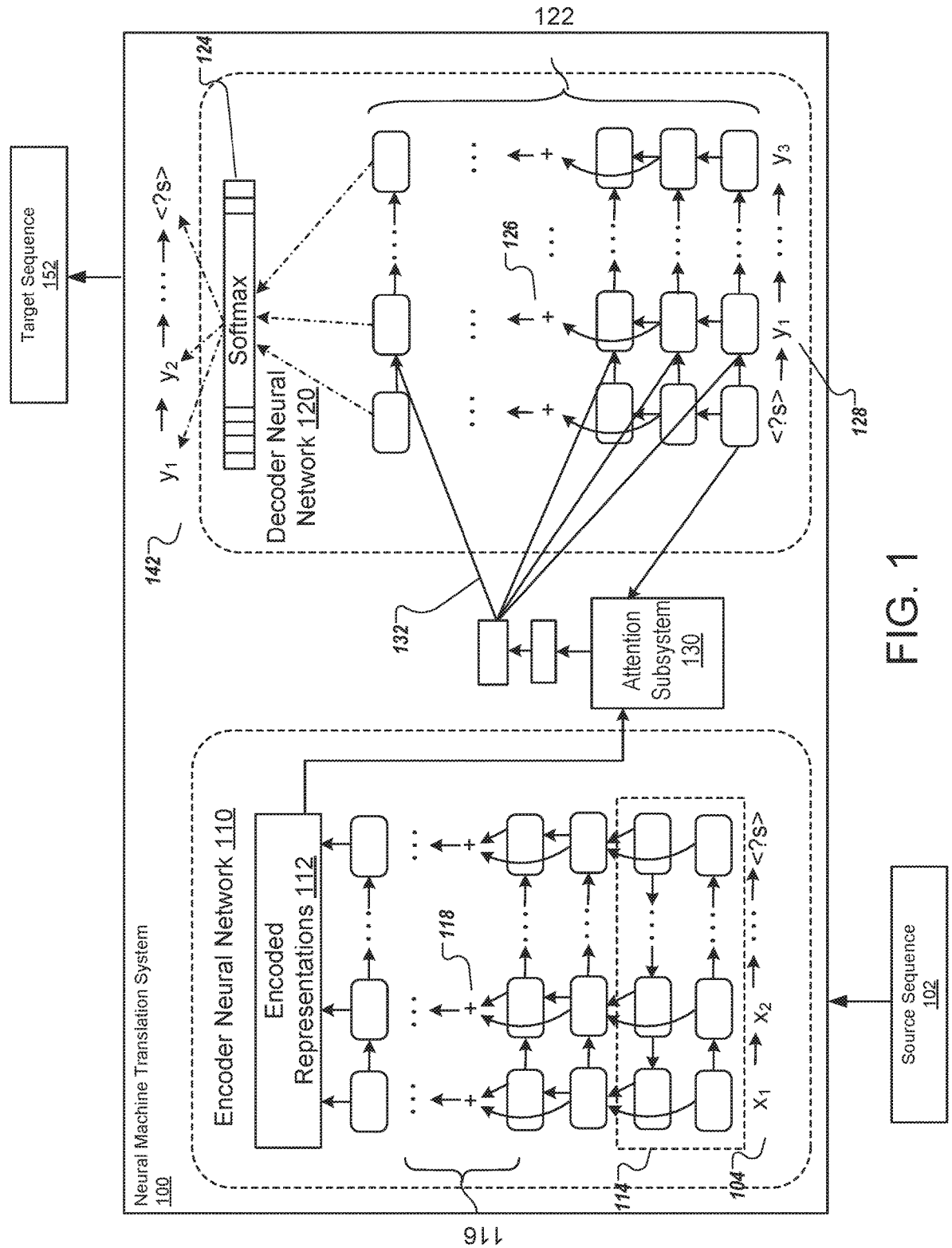
FIG. 1 shows an example neural machine translation system.

FIG. 1 shows an example neural machine translation system 100. The neural machine translation system 100 is an example of a system implemented as computer programs on one or more computers in one or more locations, in which the systems, components, and techniques described below can be implemented.

The neural machine translation system 100 translates source sequences of words in a source natural language into target sequences of words in a target natural language, e.g., sentences or phrases in English to sentences or phrases in French, sentences or phrases in English to sentences or phrases in German, or sentences or phrases in Korean to sentences or phrases in Spanish. For example, the neural machine translation system 100 can receive a source sequence 102 in the source natural language and generate a target sequence 152 that is a translation of the source sequence 102 into the target natural language.

The neural machine translation system includes an encoder neural network 110, a decoder neural network 120, and an attention subsystem 130.

To generate an input to the encoder neural network 110, the neural machine translation system 100 tokenizes the source sequence 102 into an input sequence 104 of input tokens. Generally, each input token in the input sequence 104 is selected from a vocabulary of input tokens that includes a respective token for each of a set of word units.

In addition to the word units, the vocabulary of input tokens also includes one or more special designated tokens, e.g., a start-of-sentence token and an end-of-sentence token. In some implementations, the word units are words in the source natural language. In some other implementations, some or all of the word units are sub-word units, e.g., characters, mixed word/characters, and so on.

In particular, in some of these implementations, the word units are wordpieces and the system 100 tokenizes the source sequence 102 by first breaking the words in the sequence into wordpieces using a trained wordpiece machine learning model that has been trained to break the words into wordpieces and include special word boundary symbols such that the original word sequence can be recovered from the wordpiece sequence without ambiguity. Example approaches for tokenizing sequences into wordpieces are described in Schuster, M., and Nakajima, K. Japanese and Korean voice search. 2012 IEEE International Conference on Acoustics, Speech and Signal Processing (2012) and Sennrich, R., Haddow, B., and Birch, A. Neural machine translation of rare words with subword units. In Proceedings of the 54th Annual Meeting of the Association for Computational Linguistics (2016).

The encoder neural network 110 is configured to receive the input sequence 104 and to process the input sequence 104 to generate a respective encoded representation 112 of each token in the input sequence 104.

Generally, the encoder neural network 110 includes multiple long short-term memory (LSTM) neural network layers. More specifically, the encoder neural network 110 includes a bi-directional LSTM layer 114 followed by a stack 116 of uni-directional LSTM layers. In some cases, two or more of the LSTM layers in the stack 116 are connected with residual connections 118. The operation of the encoder neural network will be described in more detail below with reference to FIGS. 2 and 3.

The decoder neural network 120 and the attention subsystem 130 are configured to process the encoded representations 112 to generate an output sequence 142 that includes output tokens from an output vocabulary.

Generally, the output vocabulary includes a respective token for each of a set of word units of words in the target natural language. In addition to the word units, the vocabulary also includes one or more special designated tokens, e.g., an end-of-sentence token. In some implementations, the word units are words in the target natural language. In some other implementations, the word units are sub-word units, e.g., characters, mixed word/characters, wordpieces, and so on for words in the target natural language. In some cases, when the word units are wordpieces, the wordpiece model is shared between the source and target language to allow strings to be copied from the source sequence to the target sequence.

Generally, for each position in the output sequence 142, the decoder neural network 120 is configured to receive the token at the preceding position in the output sequence 142, e.g., a token 128 at the second position of the output sequence 142. The decoder neural network 120 is also configured to receive an attention context vector generated by the attention subsystem 130 for the position, e.g., an attention context vector 132 for the second position of the output sequence 142, and to process the preceding token and the attention context vector to generate a set of scores that includes a respective score for each output token in the output vocabulary.

In particular, the decoder neural network 120 includes a stack 122 of LSTM layers and a softmax output layer 124. At each position, the stack 122 of LSTM layers are configured to process the preceding token and the attention context vector to generate an LSTM output for the position and the softmax output layer 124 is configured to process the LSTM output to generate the set of scores for the position. As with the encoder neural network 110, in some implementations, two or more of the LSTM layers in the stack 122 are connected with a residual connection 126.

The operation of the decoder neural network will be described in more detail below with reference to FIG. 4.

The attention subsystem 130 is configured to, at each position in the output sequence, receive the LSTM output generated by the bottom LSTM layer in the stack 122 at the preceding position and to use the received LSTM output to generate the attention context vector for the position. Generally, the attention context vector is a weighted sum of the encoded representations 112, with the weights in the weighted sum being determined based on the received LSTM output. The operation of the attention subsystem will be described in more detail below with reference to FIG. 5.

To generate the output at a given position in the output sequence 142, the system 100 selects a token based on the scores in the set of scores in the position, i.e., by selecting the token with the highest score or by sampling a token in accordance with the scores from the vocabulary of output tokens.

The system 100 continues selecting tokens and adding tokens to the output sequence until the system 100 selects an end-of-sentence output token for the current position in the output sequence 142. Once the end-of-sentence output token has been selected, the system 100 treats the outputs added to the output sequence 142 before the end-of-sentence output as the final output sequence 142.

In some implementations, the system 100 generates the output sequence 142 using beam search. That is, the system 100 maintains a beam of multiple candidate output sequences that are processed and expanded in parallel and continues processing until all of the candidate output sequences in the beam have been finalized or pruned from the beam. An example technique for maintaining and updating a beam is described below with reference to FIG. 6.

Once the output sequence 142 has been generated, the system 100 generates the target sequence 152 by converting the word units represented by the tokens in the output sequence 142 into words in the target language.

In some implementations, the encoder neural network 100 and the decoder subsystem, i.e., the decoder neural network 120 and the attention subsystem 130, are configured to perform quantized computations during generation of the output sequence 142. In particular, in some implementations, the encoder neural network 100 and the decoder subsystem perform computationally intensive operations, e.g., matrix multiplies, using 8-bit integer operations while error-sensitive accumulator values are stored using 16-bit integer values. In some implementations, only the computations within the LSTM stacks of the encoder and decoder neural networks are quantized, i.e., and not the computations of the softmax output layer or the attention subsystem.

Figure 2:
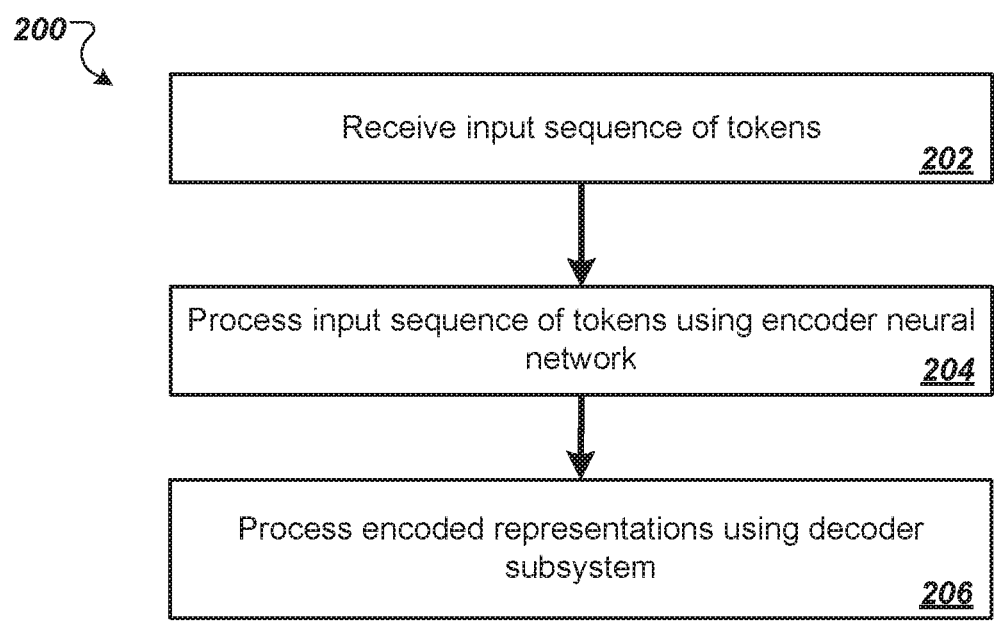
FIG. 2 is a flow diagram of an example process for generating a translation of an input sequence.

FIG. 2 is a flow diagram of an example process 200 for generating an output sequence that is a translation of an input sequence. For convenience, the process 200 will be described as being performed by a system of one or more computers located in one or more locations. For example, a neural machine translation system, e.g., the neural machine translation system 100 of FIG. 1, appropriately programmed, can perform the process 200.

The system receives an input sequence of tokens (step 202). The input sequence of tokens is a sequence that represents a first sequence of words in a natural language.

The system processes the input sequence of tokens using an encoder neural network to generate a respective encoded representation for each of the tokens in the input sequence (step 204). Processing the input sequence of tokens will be described below with reference to FIG. 3.

The system processes the encoded representations using a decoder subsystem to generate an output sequence of outputs tokens that represents a sequence of words that is a translation of the first sequence of words into a different natural language (step 206). In particular, the decoder subsystem includes a decoder neural network and an attention subsystem. Processing the encoded representations using the decoder subsystem will be described in more detail below with reference to FIGS. 4 and 5.

Figure 3:
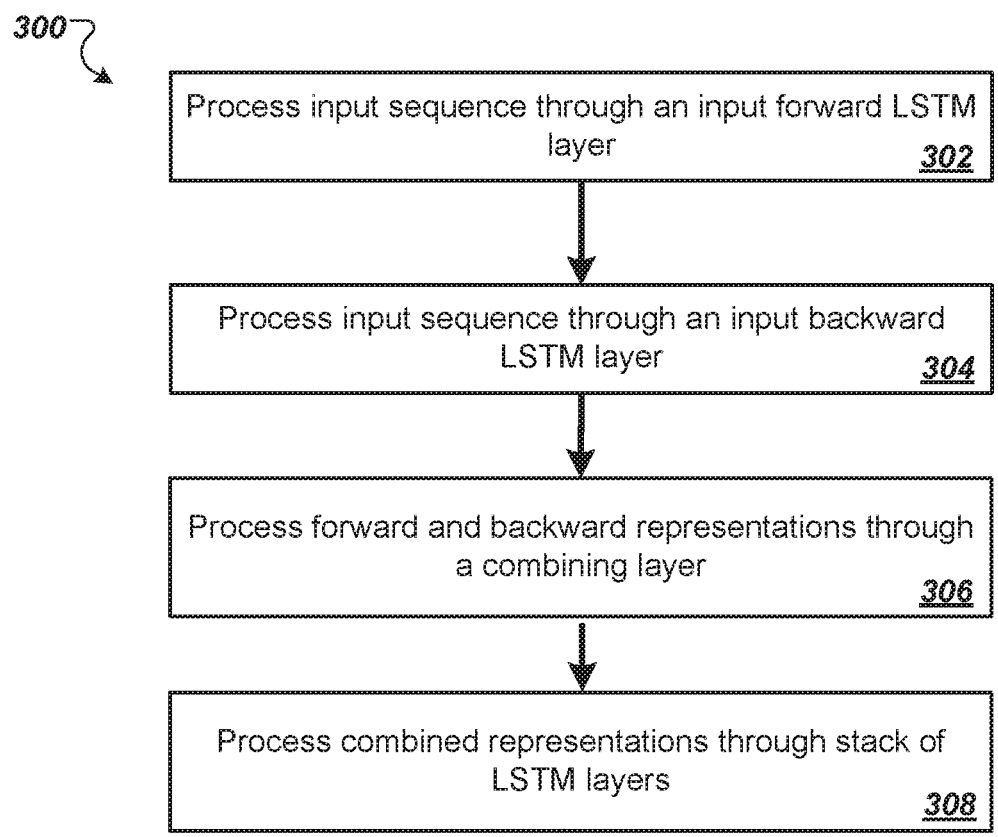
FIG. 3 is a flow diagram of an example process for generating encoded representations of tokens in an input sequence.

FIG. 3 is a flow diagram of an example process 300 for generating encoded representations of the tokens in an input sequence. For convenience, the process 300 will be described as being performed by a system of one or more computers located in one or more locations. For example, an encoder neural network, e.g., the encoder neural network of the neural machine translation system 100 of FIG. 1, appropriately programmed, can perform the process 300.

The encoder neural network processes the input sequence through an input forward LSTM layer (step 302). The input forward LSTM layer is configured to process each input token in the input sequence in a forward order to generate a respective forward representation of each input token.

The encoder neural network processes the input sequence through an input backward LSTM layer (step 304). The input backward LSTM layer is configured to process each input token in the input sequence in a backward order to generate a respective backward representation of each input token.

The encoder neural network processes the forward and backward representations of the input tokens through a combining layer (step 306). The combining layer is configured to, for each input token, combine, e.g., concatenate, the forward representation of the input token and the backward representation of the input token to generate a combined representation of the input token.

The encoder neural network processes the combined representations of the input tokens through a stack of multiple hidden LSTM layers (step 308). The multiple hidden LSTM layers are configured to process each combined representation in the forward order to generate a respective encoded representation of each of the input tokens in the input sequence. In particular, the multiple hidden LSTM layers are arranged in a stack one after the other and the encoded representation of a given input token is the output of the highest LSTM layer in the stack after the combined representation of the given input token has been processed through the stack.

Thus, the bottom layer of the encoder neural network is a bi-directional LSTM layer, i.e., the combination of the input forward, input backward, and combining layer effectively processes the input sequence in both the forward and backward directions, as the bottom layer of the encoder, the context for the words in the input sequence can effectively be captured, improving translation quality. Because the other encoder layers, i.e., the hidden LSTM layers in the stack, are unidirectional, parallelization during computations can still be achieved, reducing training and, in some cases, inference times.

Generally, to allow the encoder neural network to effectively capture subtle irregularities in the source language, there are many hidden LSTM layers in the stack, i.e., seven or more.

To improve the performance of the encoder neural network by encouraging gradient flow between the hidden layers during training, in some implementations, the encoder neural network includes residual connections between some or all of the hidden layers in the stack. For example, in some implementations, residual connections start from the layer third from the bottom of the encoder, i.e., from the second layer from the bottom of the stack of hidden layers.

When a residual connection is included between an LSTM layer A and an LSTM layer B directly above the layer A in a stack of LSTM layers, layer B receives as input both the output of layer A and the input to layer A. Layer B then element-wise adds the output of layer A and the input to layer A and then processes the sum as the new input to the layer.

Figure 4:
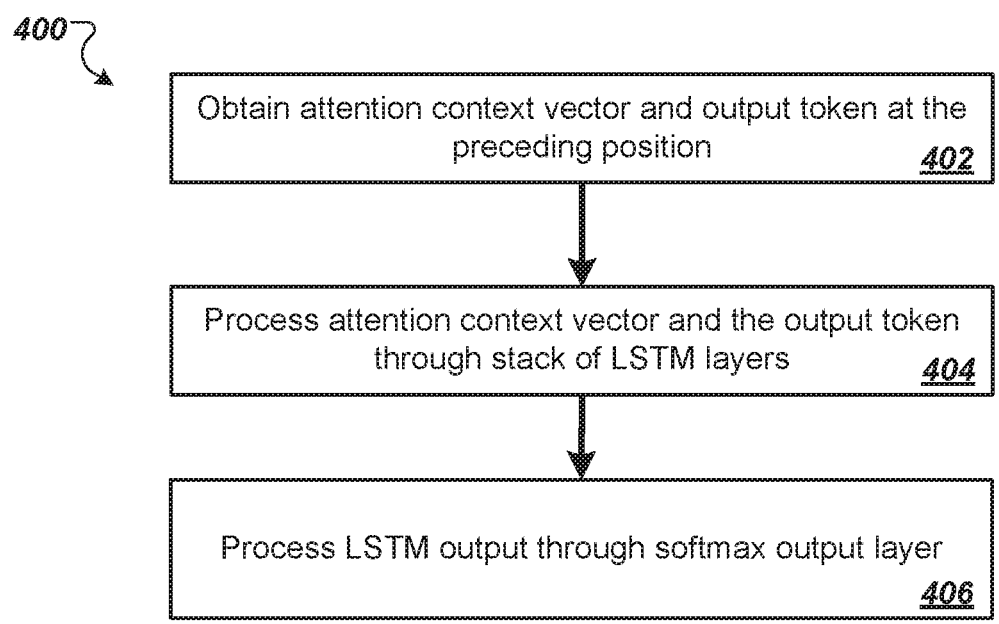
FIG. 4 is a flow diagram of an example process for generating an output for a position in an output sequence.

FIG. 4 is a flow diagram of an example process 400 for generating an output for a given position in an output sequence. For convenience, the process 400 will be described as being performed by a system of one or more computers located in one or more locations. For example, a decoder neural network, e.g., the decoder neural network of the neural machine translation system 100 of FIG. 1, appropriately programmed, can perform the process 400.

The decoder neural network obtains an attention context vector for the given position and the output token at the preceding position, i.e., the position that immediately precedes the given position in the output sequence (step 402). Generally, the attention context vector is a weighted sum over the encoded representations of the input tokens in the input sequence that has been generated by an attention subsystem. Generating the attention context vector for a given position is described in more detail below with reference to FIG. 5. When the given position is the first position in the output sequence, i.e., there is no immediately preceding position, the output token that is received can be a designated placeholder token, e.g., a predetermined start-of-sentence token.

The decoder neural network processes the attention context vector and the output token through a stack of LSTM layers to generate an LSTM output for the position (step 404). Generally, to allow the decoder neural network to capture subtle irregularities in the target language, the stack of LSTM layers includes many LSTM layers, e.g., eight or more LSTM layers.

The first LSTM layer in the stack, i.e., the bottom LSTM layer, is configured to receive the attention context vector and the output token and to process the output token to generate a bottom layer output. Each other LSTM layer in the stack is configured to receive an input including the attention context vector and the layer output generated by the LSTM layer directly before the layer in the stack and to process the input to generate a layer output for the input.

As with the encoder neural network, in some implementations, to improve the performance of the decoder neural network by encouraging gradient flow between the layers during training, the decoder neural network includes residual connections between some or all of the layers in the stack. For example, in some implementations, residual connections start from the layer third from the bottom of the decoder.

The decoder neural network processes the LSTM output through a softmax output layer to generate a respective score, e.g., a respective probability, for each output token in the vocabulary of output tokens (step 406).

The system can then select an output token for the position using the scores or can use the scores to update the maintained beam of candidate output sequences as described below.

Figure 5:
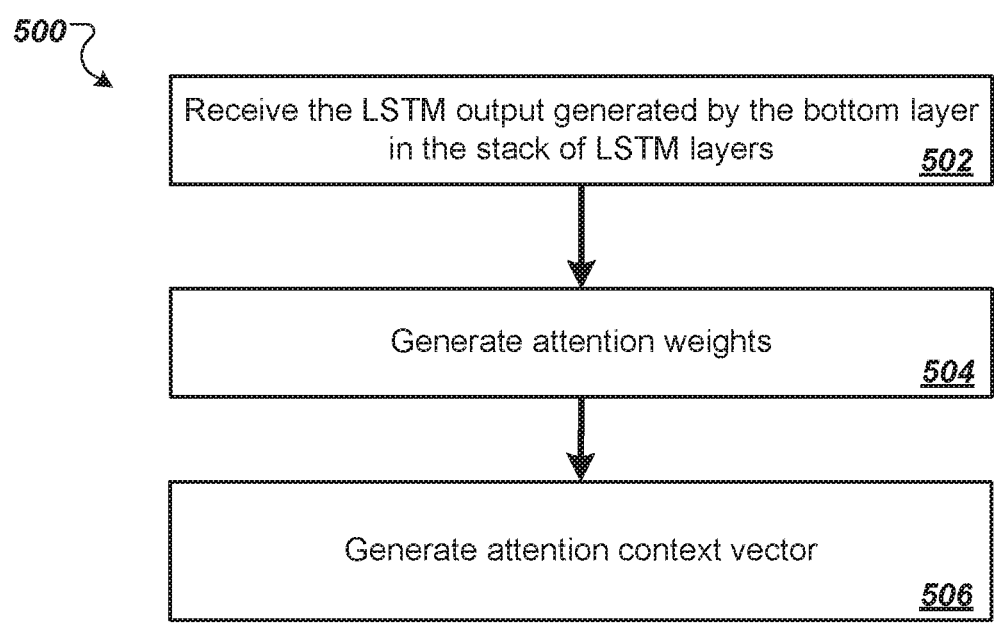
FIG. 5 is a flow diagram of an example process for generating an attention vector.

FIG. 5 is a flow diagram of an example process 500 for generating an attention context vector for a given position in an output sequence. For convenience, the process 500 will be described as being performed by a system of one or more computers located in one or more locations. For example, an attention subsystem, e.g., the attention subsystem of the neural machine translation system 100 of FIG. 1, appropriately programmed, can perform the process 500.

The attention subsystem receives the LSTM output generated by the bottom layer in the stack of LSTM layers in the decoder neural network for the preceding position in the output sequence (step 502). In particular, the attention subsystem generates the attention context vector only from the output generated by the bottom LSTM layer in the decoder stack during the processing for the preceding position in the output sequence (and the encoded representations of the input tokens), i.e., and not from the outputs of the other LSTM layers in the decoder stack. Because of this, the generation of the attention context vector can be initiated before the generation of the output token at the preceding position has been completed, improving the parallelization of the operations performed by the system and decreasing the time required to perform an inference and to train the system.

For the first position in the output sequence, the LSTM output received by the attention subsystem can be a placeholder output or can be, e.g., the encoded representation of one of the tokens, e.g. the first token or the last token, in the input sequence.

The attention subsystem generates a respective attention weight for each of the encoded representations from the bottom LSTM output and the encoded representations for the input tokens (step 504). In particular, the system applies an attention function to the bottom LSTM output and the encoded representations for the input tokens to generate a respective score for each of the encoded representations and then generates the weights by normalizing the generated scores. In some implementations, the attention function is a feed-forward neural network, e.g., a feed-forward neural network with one hidden layer. In other implementations, the attention function can be a distance function, e.g., a cosine similarity function.

The attention subsystem generates the attention context vector for the output position by determining a weighted sum of the encoded representations in accordance with the corresponding attention weights (step 506).

Figure 6:
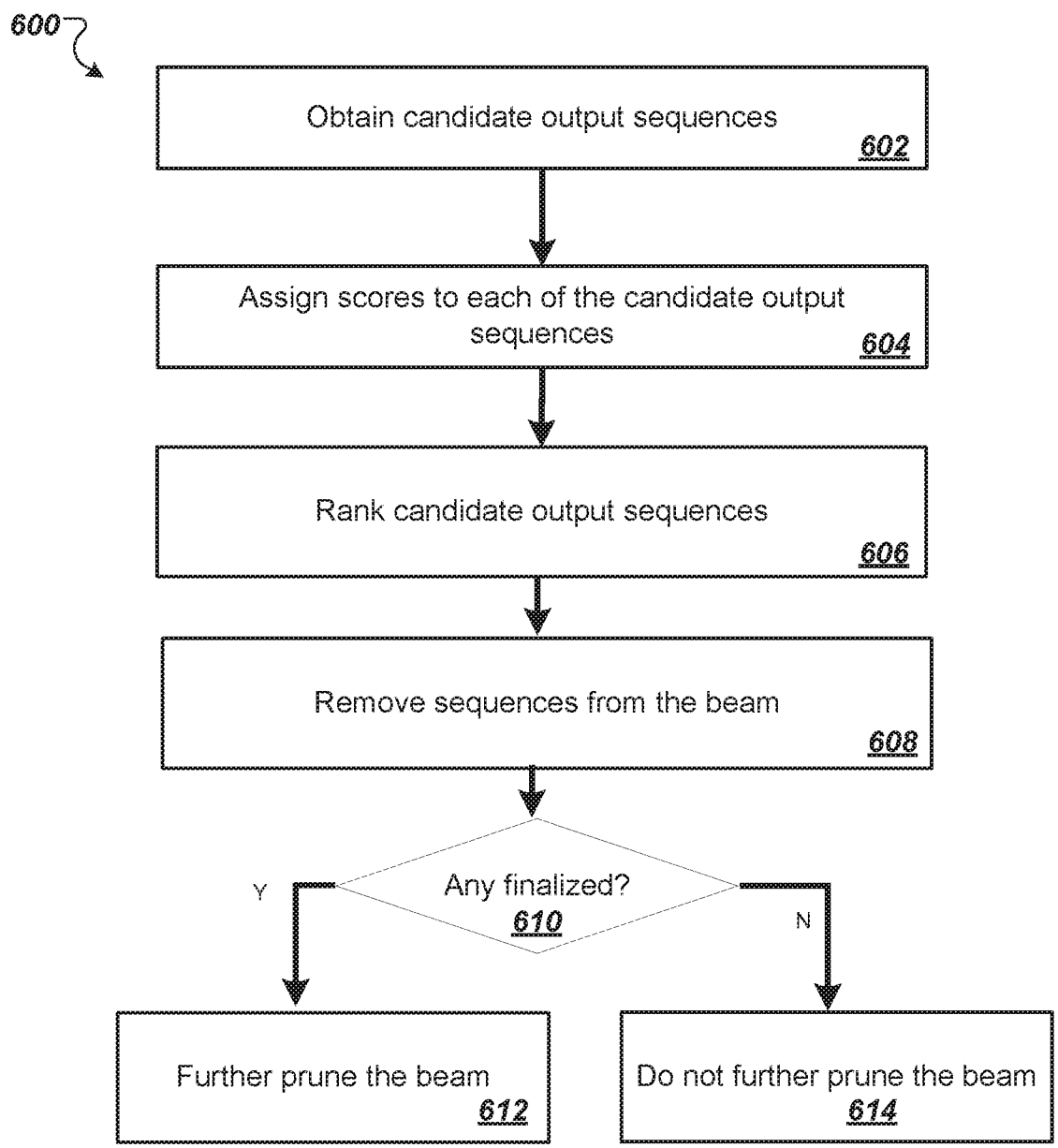
FIG. 6 is a flow diagram of an example process for maintaining a beam of candidate output sequences.

FIG. 6 is a flow diagram of an example process 600 for maintaining a beam of candidate output sequences. For convenience, the process 600 will be described as being performed by a system of one or more computers located in one or more locations. For example, a neural machine translation system, e.g., the neural machine translation system 100 of FIG. 1, appropriately programmed, can perform the process 600.

The system can repeatedly perform the process 600 as part of a beam search decoding procedure. In particular, the system can repeatedly perform the process 600 until all of the sequences in the beam have been finalized or until some other termination criteria for the decoding are satisfied, e.g., only a certain number of candidate output sequences satisfy criteria for remaining in the beam or the longest candidate output sequence in the beam has more than a threshold number of tokens.

The system obtains a plurality of candidate output sequences from a neural machine translation system, e.g., the neural machine translation system 100 of FIG. 1 (step 602). In particular, the candidate output sequences can include each finalized candidate sequence that was in the beam at the end of the preceding iteration of the process 600 and, for each candidate sequence that was in the beam at the end of the preceding iteration of the process 600 but that was not finalized, one or more expansions of the candidate sequence. An expansion of a candidate sequence has a new token appended to the end of the candidate sequence, with each expansion of the candidate sequence having a different token appended to the end of the sequence. The system also obtains, for each expansion, a local score for the token appended to the end of the sequence as generated by the neural machine translation systems.

In some implementations, for each candidate sequence that was in the beam but was not finalized, the system discards the expansions of candidate sequence that have a local score that is more than a threshold value below a highest local score.

The system then maintains at most a predetermined number of the candidate output sequences in the beam for further consideration by the neural machine translation system, i.e., for further processing by the neural machine translation system.

In particular, to determine which candidate output sequence to maintain in the beam, the system assigns a respective score to each of the of the candidate output sequences (step 604). Generally, the system assigns an initial score to each of the sequences and, optionally, modifies the initial score for each sequence by applying a coverage penalty, a length normalization penalty, or both, to the initial score to generate the final score for the sequence.

In particular, the system determines the initial score for a given sequence based on a log likelihood of the candidate output sequence according to output scores generated by the neural machine translation system. That is, as described above, at each position in an output sequence, a neural machine translation system generates a respective score for each of multiple possible tokens in the output sequence. To determine the initial score for a candidate output sequence, the system determines a sum of the logarithms of the scores generated for each of the tokens in the sequence by the neural machine translation system at the position at which the token is located. Because the scores generated by the translation system are generally probabilities, the initial score for the sequence will typically be negative, i.e., because the logarithm of a number between zero and one is a negative number.

In some implementations, prior to computing any initial scores and for each candidate sequence from the previous iteration of the process, the system discards from consideration any expansion of the candidate sequence for which the score assigned to the new token by the neural machine translation system was lower by more than a threshold than the highest-score assigned to any expansion of the candidate sequence.

In implementations where the system applies a length normalization penalty, the system then normalizes the initial score for the candidate sequence based on a number of output tokens that are in the output sequence. Generally, the system applies the penalty by dividing the initial score by a penalty term that is larger the more output tokens there are in the output sequence. Employing such a penalty allows the system to effectively compare candidate sequences of different lengths during decoding, i.e., without excessively favoring shorter results over longer ones. In some implementations, the penalty term is the length of the sequence, i.e., the number of tokens that are in the sequence. In some other implementations, the penalty term is length$^\alpha$, where α is a constant between zero and one, e.g., a value between 0.6 and 0.7 and length is the length of the sequence, i.e., the number of tokens in the sequence. In yet other implementations the penalty lp can satisfy:

$$lp = \frac{(b+|Y|)^\alpha}{(b+1)^\alpha},$$

where b is a positive constant, e.g., 5, |Y| is the length of the sequence, and α is constant between zero and one, e.g., 0.2.

In implementations where the system applies a coverage penalty, the system then adds a coverage penalty term to the normalized initial score (or, if length normalization is not employed, the initial score). Generally, the coverage penalty term favors candidate output sequences that fully cover the words in the first sequence as determined by the attention mechanism employed by the neural machine translation system. For example, the coverage penalty term cp can satisfy:

$$cp=\beta * \Sigma_{i=1}^{|X|} \log(\min(\Sigma_{j=1}^{|Y|} p_{i,j}),1),$$

where β is a positive constant value between zero and one, e.g., 0.2, i ranges over the tokens in the input sequence, j ranges over the tokens in the candidate output sequence, and $p_{i,j}$ is the weight generated by the attention mechanism for the i-th input token when processing the j-th output token.

The system ranks the candidate output sequences based on the final scores, i.e., from the candidate output sequence having the highest final score to the sequence having the lowest score (step 606).

The system removes from the beam all candidate output sequences other than the predetermined number of highest-ranked candidate output sequences according to the ranking (step 608).

The system then determines whether any of the remaining candidate output sequences in the beam have been identified as finalized by the neural machine translation system (step 610). Generally, an output sequence has been identified as finalized when the output sequence ends in a designated token, e.g., a predetermined end-of-sentence output token.

When at least one candidate output sequence has been finalized, the system removes from the beam all candidate output sequences that have a score that is more than a threshold value lower than the score for the highest-ranked finalized candidate output sequence (step 612). By pruning the beam in this manner, the system can decrease the number of additional iterations that need to be performed once a sufficiently high quality hypothesis has been identified, lowering inference time without significantly impacting translation quality. If, after this additional pruning, the beam includes only finalized sequences, the system can select the highest-ranked candidate sequence as the translation for the input sequence. If the beam still includes non-finalized candidate sequences and any other termination criteria have not been met, the system provides the non-finalized candidate sequences in the beam to the neural machine translation system for further processing. That is, the system provides each non-finalized sequence in the beam to the neural machine translation system so that the neural machine translation system can score possible expansions to each non-finalized sequence.

When none of the candidate output sequences have been finalized, the system does not further prune the beam and provides the candidate output sequences in the beam to the neural machine translation system for further processing (step 614).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural machine translation system implemented by one or more computers, the neural machine translation system configured to receive an input sequence of input tokens representing a first sequence of words in a first natural language and to generate an output sequence of output tokens representing a second sequence of words that is a translation of the first sequence into a second natural language, the neural machine translation system comprising:
  an encoder neural network comprising:
    an input forward long short-term memory (LSTM) layer configured to process each input token in the input sequence in a forward order to generate a respective forward representation of each input token, an input backward LSTM layer configured to process each input token in the input sequence in a backward order to generate a respective backward representation of each input token, a combining layer configured to, for each input token in the input sequence, combine the forward representation of the input token and the backward representation of the input token to generate a combined representation of the input token, and a plurality of hidden LSTM layers configured to process each combined representation generated by the combining layer in the forward order to generate a respective encoded representation of each of the input tokens in the input sequence, wherein the plurality of hidden LSTM layers are unidirectional and arranged in a stack one after the other; and a decoder subsystem configured to receive the respective encoded representation of each of the input tokens in the input sequence and to process the encoded representations to generate the output sequence.

2. The neural machine translation system of claim 1, wherein the plurality of hidden LSTM layers comprises at least seven LSTM layers.

3. The neural machine translation system of claim 2, wherein at least two of the plurality of hidden LSTM layers are connected with a residual connection.

4. The neural machine translation system of claim 1, wherein the decoder subsystem comprises:

a decoder neural network, the decoder neural network comprising:

a plurality of LSTM layers arranged in a stack one on top of the other and configured to, for each of a plurality of positions in the output sequence:

receive an attention context vector and the output token at a preceding position in the output sequence, and process the attention context vector and the token at the preceding position in the output sequence to generate an LSTM output for the position, and a softmax output layer, the softmax output layer configured to, for each of the plurality of positions, receive the LSTM output for the position and to generate a respective score for each output token in a vocabulary of output tokens.

5. The neural machine translation system of claim 4, wherein the plurality of LSTM layers comprises at least eight LSTM layers.

6. The neural machine translation system of any one of claim 4, wherein at least two of the plurality of LSTM layers are connected with a residual connection.

7. The neural machine translation system of claim 6, wherein a first LSTM layer in the stack is configured to, for each of the plurality of positions:

receive a first layer input comprising the attention context vector, a layer output generated by a LSTM layer directly below the first LSTM layer in the stack, and a layer input to the LSTM layer directly below the first LSTM layer in the stack; and process the first layer input in accordance with a current hidden state of the first LSTM layer to generate a first layer output and to update the current hidden state.

8. The neural machine translation system of claim 4, wherein the decoder system further comprises:

an attention subsystem, wherein the attention subsystem is configured to, for each of the plurality of positions:

receive an attention input comprising a bottom layer output generated by a bottom LSTM layer in the stack of LSTM layers in the decoder neural network for the preceding position; and process the attention input to generate the attention context vector for the time step.

9. The neural machine translation system of claim 8, wherein processing the bottom layer output and the respective encoded representation of each of the input tokens in the input sequence to generate the attention context vector for the time step comprises, for each of the plurality of time steps:

processing the bottom layer output and the encoded representations through one or more neural network layers to generate a respective score for each of the input tokens;

generating a respective weight for each of the input tokens from the respective scores; and determining a weighted sum of the encoded representations in accordance with the weights.

10. The neural machine translation system of any one of claim 1, wherein the input and output tokens are wordpieces.

11. The neural machine translation system of claim 1, wherein the encoder neural network and the decoder subsystem are configured to perform quantized computations during generation of the output sequence.

12. One or more non-transitory computer-readable storage media encoded with instructions that, when executed by one or more computers, cause the one or more computers to implement a neural machine translation system that is configured to receive an input sequence of input tokens representing a first sequence of words in a first natural language and to generate an output sequence of output tokens representing a second sequence of words that is a translation of the first sequence into a second natural language, the neural machine translation system comprising:

an encoder neural network comprising:

an input forward long short-term memory (LSTM) layer configured to process each input token in the input sequence in a forward order to generate a respective forward representation of each input token, an input backward LSTM layer configured to process each input token in the input sequence in a backward order to generate a respective backward representation of each input token, a combining layer configured to, for each input token in the input sequence, combine the forward representation of the input token and the backward representation of the input token to generate a combined representation of the input token, and a plurality of hidden LSTM layers configured to process each combined representation generated by the combining layer in the forward order to generate a respective encoded representation of each of the input tokens in the input sequence, wherein the plurality of hidden LSTM layers are unidirectional and arranged in a stack one after the other; and a decoder subsystem configured to receive the respective encoded representation of each of the input tokens in the input sequence and to process the encoded representations to generate the output sequence.

13. The computer-readable storage media of claim 12, wherein the decoder subsystem comprises:

a decoder neural network, the decoder neural network comprising:
  a plurality of LSTM layers arranged in a stack one on top of the other and configured to, for each of a plurality of positions in the output sequence:
    receive an attention context vector and the output token at a preceding position in the output sequence, and
    process the attention context vector and the token at the preceding position in the output sequence to generate an LSTM output for the position, and
  a softmax output layer, the softmax output layer configured to, for each of the plurality of positions, receive the LSTM output for the position and to generate a respective score for each output token in a vocabulary of output tokens.

14. The computer-readable storage media of claim 13, wherein the decoder system further comprises:
  an attention subsystem, wherein the attention subsystem is configured to, for each of the plurality of positions:
    receive an attention input comprising a bottom layer output generated by a bottom LSTM layer in the stack of LSTM layers in the decoder neural network for the preceding position; and
    process the attention input to generate the attention context vector for the time step.

15. A method performed by one or more computers, the method comprising:
  receiving an input sequence of input tokens representing a first sequence of words in a first natural language, and
  processing the input sequence using a neural machine translation system to generate an output sequence of output tokens representing a second sequence of words that is a translation of the first sequence into a second natural language, the neural machine translation system comprising:
    an encoder neural network comprising:
      an input forward long short-term memory (LSTM) layer configured to process each input token in the input sequence in a forward order to generate a respective forward representation of each input token,
      an input backward LSTM layer configured to process each input token in the input sequence in a backward order to generate a respective backward representation of each input token,
      a combining layer configured to, for each input token in the input sequence, combine the forward representation of the input token and the backward representation of the input token to generate a combined representation of the input token, and
      a plurality of hidden LSTM layers configured to process each combined representation generated by the combining layer in the forward order to generate a respective encoded representation of each of the input tokens in the input sequence, wherein the plurality of hidden LSTM layers are unidirectional and arranged in a stack one after the other; and
    a decoder subsystem configured to receive the respective encoded representation of each of the input tokens in the input sequence and to process the encoded representations to generate the output sequence.

16. The method of claim 15, wherein the plurality of hidden LSTM layers comprises at least seven LSTM layers.

17. The method of claim 16, wherein at least two of the plurality of hidden LSTM layers are connected with a residual connection.

18. The method of claim 15, wherein the decoder subsystem comprises:
  a decoder neural network, the decoder neural network comprising:
    a plurality of LSTM layers arranged in a stack one on top of the other and configured to, for each of a plurality of positions in the output sequence;
      receive an attention context vector and the output token at a preceding position in the output sequence, and
      process the attention context vector and the token at the preceding position in the output sequence to generate an LSTM output for the position, and
    a softmax output layer, the softmax output layer configured to, for each of the plurality of positions, receive the LSTM output for the position and to generate a respective score for each output token in a vocabulary of output tokens.

19. The method of claim 18, wherein the plurality of LSTM layers comprises at least eight LSTM layers.

* * * * *